(12) United States Patent
Fu et al.

(10) Patent No.: US 10,072,635 B2
(45) Date of Patent: Sep. 11, 2018

(54) WIND TURBINE AND METHOD FOR EVALUATING HEALTH STATE OF BLADE THEREOF

(71) Applicant: General Electric Company, Schenectady, NY (US)

(72) Inventors: Xu Fu, Shanghai (CN); Zhilin Wu, Shanghai (CN); Hai Qiu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 843 days.

(21) Appl. No.: 14/528,101

(22) Filed: Oct. 30, 2014

(65) Prior Publication Data

US 2015/0134272 A1      May 14, 2015

(30) Foreign Application Priority Data

Oct. 30, 2013   (CN) .......................... 2013 1 0526002

(51) Int. Cl.
*F03D 11/00* (2006.01)
*G01M 15/14* (2006.01)
(Continued)

(52) U.S. Cl.
CPC .......... *F03D 11/0091* (2013.01); *F03D 17/00* (2016.05); *G01L 3/02* (2013.01);
(Continued)

(58) Field of Classification Search
CPC ............ F03D 11/00; F03D 17/00; G01L 3/02; G01M 15/14; G01P 3/00; F05B 2270/334; F05B 2270/80; F05B 2270/807
See application file for complete search history.

(56) References Cited

U.S. PATENT DOCUMENTS

2006/0070435 A1    4/2006  LeMieux et al.
2006/0140761 A1*   6/2006  LeMieux ................ F03D 7/042
                                                          416/61
(Continued)

FOREIGN PATENT DOCUMENTS

CN       101245765 A      8/2008
DE    202008005030 U1     9/2008
(Continued)

OTHER PUBLICATIONS

European Search Report and Written Opinion issued in connection with corresponding EP Application No. 14191055.4-1607 dated Mar. 24, 2015.
(Continued)

*Primary Examiner* — Mohamed Charioui
*Assistant Examiner* — Jeremy Delozier
(74) *Attorney, Agent, or Firm* — Douglas D. Zhang; GE Global Patent Operation

(57) ABSTRACT

A wind turbine including a plurality of blades, a micro inertial measurement unit installed on each blade and configured to sense a plurality of detection parameter signals at corresponding installation positions, and a monitoring system configured to monitor an operating state of the blades. The monitoring system includes a signal processing unit configured to obtain a processing parameter signal through calculation based on the detection parameter signals, a signal analyzing unit configured to analyze each analysis parameter signal, selected from the plurality of detection parameter signals and the processing parameter signal, to obtain a fault estimation signal, used to estimate whether a corresponding blade works in a fault state, and a fault evaluating unit configured to evaluate, based on a plurality of fault estimation signals, whether a corresponding blade fails or a probability that the corresponding blade fails.

14 Claims, 7 Drawing Sheets

(51) Int. Cl.
*G01L 3/02* (2006.01)
*G01P 3/00* (2006.01)
*F03D 17/00* (2016.01)

(52) U.S. Cl.
CPC ............... *G01M 15/14* (2013.01); *G01P 3/00* (2013.01); *F05B 2270/334* (2013.01); *F05B 2270/80* (2013.01); *F05B 2270/807* (2013.01)

(56) References Cited

U.S. PATENT DOCUMENTS

| | | |
|---|---|---|
| 2009/0257873 A1 | 10/2009 | Egedal et al. |
| 2011/0211200 A1* | 9/2011 | Cribbs .................. F03D 1/0675 356/614 |
| 2011/0246094 A1 | 10/2011 | Olesen |
| 2011/0285129 A1* | 11/2011 | Li ............................. F03D 1/06 290/44 |
| 2012/0010852 A1 | 1/2012 | Winkelmann et al. |
| 2012/0209539 A1 | 8/2012 | Kim |
| 2012/0253697 A1 | 10/2012 | Frankenstein et al. |
| 2012/0292905 A1 | 11/2012 | Slot |
| 2012/0303277 A1 | 11/2012 | Fu et al. |
| 2015/0000404 A1* | 1/2015 | Brenner .................. F03D 17/00 73/579 |

FOREIGN PATENT DOCUMENTS

| | | |
|---|---|---|
| DE | 102011116961 A1 | 5/2013 |
| EP | 1075600 A1 | 2/2001 |
| WO | 199957435 A1 | 11/1999 |
| WO | 2013110215 A1 | 8/2013 |

OTHER PUBLICATIONS

Sorensen et al., "Fundamentals for Remote Structural Health Monitoring of Wind Turbine Blades ? a Preproject", Internet Citation, May 1, 2002.

Unofficial English Translation of Chinese Office Action issued in connection with corresponding CN Application No. 201310526002.X dated Oct. 31, 2016.

White et al., "Updating of a Wind Turbine Model for the Evaluation of Methods for Operational Monitoring Using Inertial Measurements", 48th AIAA Aerospace Sciences Meeting Including the New Horizons Forum and Aerospace Exposition, pp. 1-15, Jan. 2010.

Griffith et al., "Structural Health and Prognostics Management for Offshore Wind Turbines: An Initial Roadmap", Sandia National Laboratories, pp. 1-64, Dec. 2012.

\* cited by examiner

WIND TURBINE AND METHOD FOR EVALUATING HEALTH STATE OF BLADE THEREOF

TECHNICAL FIELD

Embodiments of the present invention relate to a wind turbine, and in particular, to a method for evaluating a health state of a blade thereof.

BACKGROUND

As clean energy, wind energy is widely applied to the power generation field. A wind turbine is usually configured to convert the wind energy into electric energy. However, the wind turbine usually operates in a remote area and a severe environment, and when the wind turbine is particularly affected by environments such as frost, dust, and gale, the wind turbine is prone to fail, where faults include, for example, blade crack, blade clamping stagnation, blade strain, blade icing, or overloading. Therefore, in order to prolong a life span of the wind turbine, it is necessary to regularly overhaul and maintain the wind turbine to prevent potential faults. However, on one hand, manual overhaul is high in cost, and on the other hand, current fault detection is not very reliability. A blade parameter signal of the wind turbine is monitored in real time and a probability that the wind turbine works in a fault state is evaluated, to reduce unnecessary scheduled maintenance, thereby improving reliability and lowering maintenance cost.

In order to evaluate the fault state of the wind turbine, it is usually necessary to monitor, in a running process of the wind turbine, multiple types of parameters, such as a blade pitch, a blade deflection, a local blade angle, a blade bending moment, a blade rotating speed, a yaw, a rotor speed, and a structural vibration in real time, and then analyze these parameters to evaluate occurrence of a fault. However, because it is necessary to install different types of sensors on each part of the wind turbine at the same time, and sometimes, it is further necessary to install two or more types of sensors on a certain position at the same time, problems such as complicated parameter monitoring and high cost may be caused. Minimizing the number of sensors required to analyze as many detection parameters as possible to evaluate the probability that the wind turbine works in a fault state becomes a key technical problem to be settled urgently.

Therefore, it is necessary to provide an improved wind turbine to solve the foregoing technical problem.

SUMMARY

One or more embodiments of the present invention are summarized below to facilitate a basic understanding of the present invention, the summary is not an overview, and is neither intended to identify certain necessary elements of the present invention, nor intended to limit the scope of the present invention. On the contrary, the main purpose of the summary is to present some concepts of the present invention in a simplified form before the detailed description below.

One aspect of the present invention provides a wind turbine, including: a micro inertial measurement unit, installed on each blade, and configured to sense a plurality of detection parameter signals at corresponding installation positions; and a monitoring system, configured to monitor an operating state of the plurality of blades, and the monitoring system includes:

a. a signal processing unit, configured to obtain a processing parameter signal through calculation based on the plurality of detection parameter signals obtained by the micro inertial measurement unit;

b. a signal analyzing unit, configured to analyze each analysis parameter signal to obtain a fault estimation signal, where the analysis parameter signal is selected from the plurality of detection parameter signals and the processing parameter signal, and each fault estimation signal is used to estimate whether a corresponding blade works in a fault state; and c. a fault evaluating unit, configured to evaluate, based on a plurality of fault estimation signals, whether a corresponding blade fails or a probability that the corresponding blade fails.

Another aspect of the present invention provides a method for evaluating a health state of a wind turbine blade. The method includes: sensing a plurality of detection parameter signals at corresponding installation positions by using micro inertial measurement units installed on each blade; obtaining a processing parameter signal through calculation based on the plurality of detection parameter signals; analyzing each analysis parameter signal to obtain a fault estimation signal, where the analysis parameter signal is selected from the plurality of detection parameter signals and the processing parameter signal, and each fault estimation signal is used to estimate whether a corresponding blade works in a fault state; and evaluating, based on a plurality of fault estimation signals, whether a corresponding blade fails or a probability that the corresponding blade fails.

Compared with the prior art, the present invention uses a micro inertial measurement unit to provide a monitoring system with detection parameter signals, and the micro inertial measurement unit may detect multiple types of parameter signals at the same time and obtain multiple types of processing parameter signals through calculation. Therefore, cost may be saved and complexity of parameter signal detection may be reduced by installing a small number of micro inertial measurement units. Both the detection parameter signals and the processing parameter signal may be used as an analysis parameter signal, and each analysis parameter signal may be analyzed to obtain a fault estimation signal, which is used to evaluate whether a corresponding blade fails or a probability that the corresponding blade works in a fault state. The monitoring system used in the present invention is simple in structure, and a fault analysis performed for a plurality of analysis parameter signals may improve accuracy of fault state evaluation.

BRIEF DESCRIPTION OF THE DRAWINGS

The present invention may be understood in a better way by describing the embodiments of the present invention with reference to the accompanying drawings, where in the accompanying drawings.

DETAILED DESCRIPTION

The following will describe specific embodiments of the present invention. It should be noted that, in the specific description of these embodiments, in order to be terse and concise, it is impossible to describe in the specification all features of all possible embodiments in detail. It should be understood that, in an actual implementation of any of the embodiments, as in a process of any one project or design project, in order to achieve the developers' specific goals, and in order to meet system-related or business-related limitations, various specific decisions may usually be made, and the decisions may change from one embodiment to another embodiment. In addition, it can also be understood that, although efforts made in the development process may be complicated and lengthy, for a person of ordinary skill in the art related to the content disclosed in the present invention, some changes, such as in design, manufacturing, or production, made based on the technical content disclosed in the disclosure are common technical means, and should be construed as part of the content of the present disclosure.

Unless otherwise defined, the technical terms or scientific terms used in the claims and specification should be the ordinary meaning understood by a person of ordinary skill in the technical field of the present invention. The "first", "second" and similar words used in the patent application specification and claims of the present invention do not denote any order, quantity, or importance, but are just used to distinguish different components. "A" or "an" and other similar words do not denote quantity limitations, but denote that at least one exists. "Comprises" or "comprising" and other similar words imply that an element or object appearing before the "comprises" or "comprising" covers enumerated elements or objects and equivalents elements thereof appearing after the "comprises" or "comprising", without excluding other elements or objects. "Connected" or "coupled" and other similar words are not limited to physical or mechanical connections, but may include electrical connections, either in a direct or indirect manner.

Figure 1:
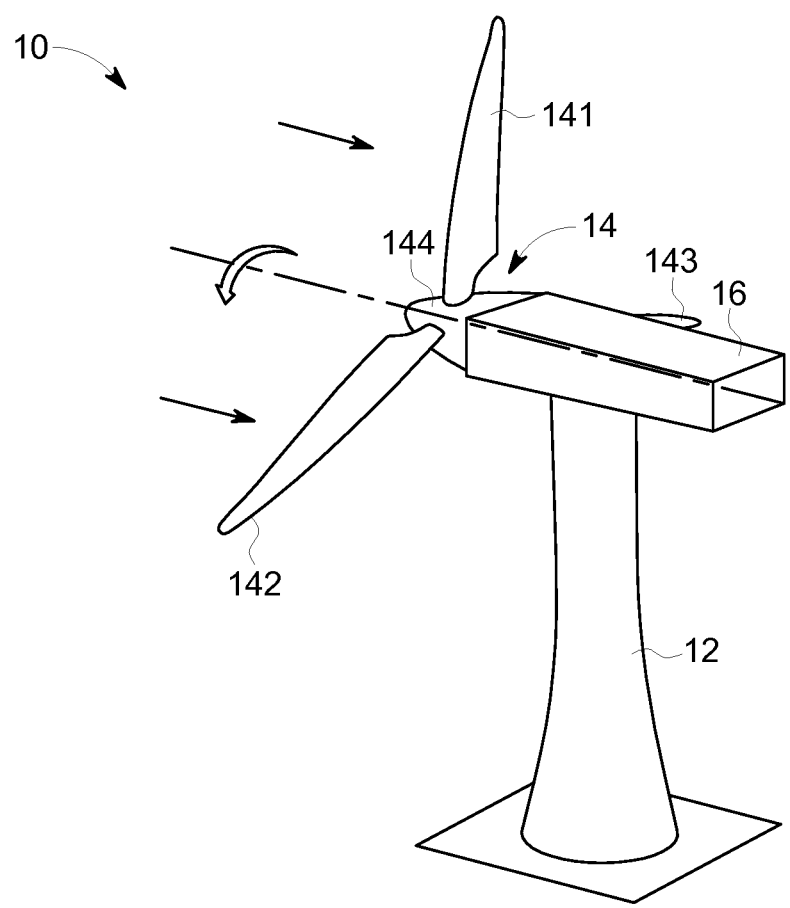
FIG. 1 is a schematic diagram of a wind turbine according to an embodiment of the present invention.

Referring to FIG. 1, FIG. 1 is a schematic diagram of a wind turbine 10 according to an embodiment of the present invention. More specifically, the wind turbine 10 is a horizontal-axis wind turbine. The wind turbine 10 includes a tower 12 and a rotor 14. The rotor 14 includes several blades, for example, three blades 141, 142, and 143 as shown in FIG. 1. The three blades 141, 142, and 143 are installed on one hub 144. When working, the three blades 141, 142, and 143 rotate under thrust of wind energy, and then generate a driving torque to rotate a main axis (not shown) connected to the rotor 14, so as to drive a generator (not shown) to generate electricity through rotation. Elements such as the main axis and the generator are installed inside an engine room 16. The engine room 16 is installed on the tower 12 in a rotating manner. There is a yaw system between the tower 12 and the engine room 16, and the yaw system may adjust a direction of the engine room 16 in real time, so that the blades 141, 142, and 143 are located in an optimal wind direction position in real time to obtain a maximum rotating torque. FIG. 1 merely illustrates main components of the wind turbine 10, and in another embodiment, the wind turbine 10 may also be a wind turbine of another type such as a vertical axis wind turbine.

Figure 2:
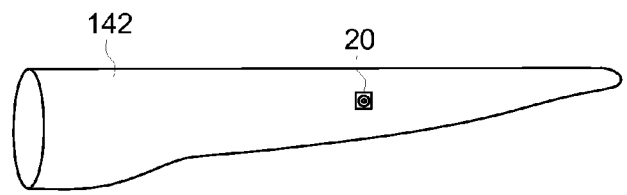
FIG. 2 is a schematic diagram of a blade on the wind turbine shown in FIG. 1.

Referring to FIG. 2, FIG. 2 is a schematic diagram of a blade 142 on the wind turbine 10, other blades 141 and 143 also have a similar structure, and only one blade is exemplified for description herein. In an embodiment of FIG. 2, a micro inertial measurement unit (MIMU) 20 is installed on an outer surface of the blade 142. In another embodiment, the micro inertial measurement unit 20 may also be installed on an inner surface of the blade 142 or embedded in a body of the blade 142. Further, there may also be a plurality of the micro inertial measurement units 20, which may be separately installed on different positions of the blade, such as a tip part, a middle part, a top, and a bottom of the blade, so as to sense enough parameter signals for use of subsequent calculations. The words "root part", "tip part", "bottom", "middle part" and "top" herein do not refer to absolute points, but may refer to a certain area nearby, and different words are merely used herein for distinction. For example, one micro inertial measurement unit 20 is installed on the middle part of the blade 142 shown in FIG. 2, and specific installation may be adjusted according to actual requirements. In another embodiment, the micro inertial measurement unit 20 may be further installed on other parts of the wind turbine 10, for example, installed on the tower 12 or the engine room 16, so as to further provide parameter signals of different positions and types according to requirements.

It should be noted that, the micro inertial measurement unit 20 is a comprehensive motion capture sensing apparatus, and is configured to sense, but not limited to, a three-dimensional direction signal (a pitch angle, a roll angle, and a yaw angle), a three-dimensional accelerated speed signal, a three-dimensional rotating speed signal, a three-dimensional magnetic signal, and so on. In a non-limiting embodiment, the micro inertial measurement unit 20 may include a three-dimensional accelerometer, a three-dimensional gyroscope, a three-dimensional magnetometer, or merely include one or two of the foregoing three measuring instruments. In order to evaluate a fault state of the wind turbine 10 especially a fault state of several blades, it is necessary to monitor and analyze several parameters of the blades to determine the fault state of the specific blades. Cost may be lowered by selecting a micro inertial measurement unit of a suitable type to monitor the several parameters.

Figure 3:
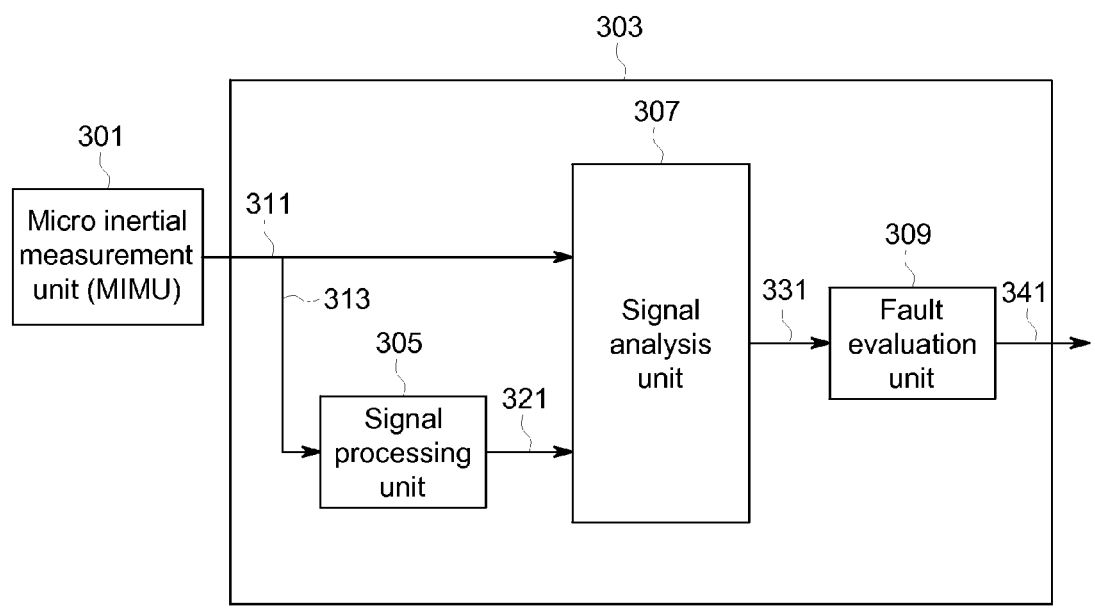
FIG. 3 is a schematic block diagram of a wind turbine blade fault monitoring system according to an embodiment of the present invention.

Referring to FIG. 3, FIG. 3 is a block diagram of a monitoring system 303 of the wind turbine 10 according to an embodiment. In some embodiments, the monitoring system 303 may be installed inside the tower 12 or the engine room 16. In another embodiment, the monitoring system 303 may be installed in a monitoring room for observation of monitoring personnel. In order to evaluate whether the wind turbine 10 works in a fault state or a probability that the wind turbine 10 works in a fault state, the present invention proposes a method for evaluating a probability that the wind turbine works in a fault state based on detection parameter signals of the micro inertial measurement unit. The fault state herein includes, but is not limited to, blade crack, blade clamping stagnation, blade strain, blade icing, overloading, and so on.

The monitoring system 303 is configured to monitor a health state of the blades 141, 142, and 143 according to a plurality of detection parameter signals 311 sensed by the micro inertial measurement unit 20, and more specifically, is configured to monitor whether one or more of the blades 141, 142, and 143 work in a fault state. The monitoring system 303 includes a signal processing unit 305, a signal analyzing unit 307, and a fault evaluating unit 309. In some embodiments, the signal processing unit 305, the signal analyzing unit 307, and the fault evaluating unit 309 may be integrated into a same processing chip. In another embodiment, the signal processing unit 305, the signal analyzing unit 307, and the fault evaluating unit 309 may belong to different processing chips.

The signal processing unit 305 is configured to receive the plurality of detection parameter signals 311 sensed by the micro inertial measurement units 20 on the blades 141, 142, and 143, and then obtain one or more specific processing parameter signals 321 by using an algorithm program. In a non-limiting embodiment, according to some detection parameter signals 313 sensed by the micro inertial measurement unit 20 on the blade 142 shown in FIG. 2, the signal processing unit 305 may obtain a processing parameter signal 321 through calculation. The processing parameter signal 321 may include, but be not limited to, a blade pitch, a blade rotating speed, a structural vibration, a blade deflection, a local blade angle, a blade torque, a blade tip offset, a three-dimensional motion trail, and so on.

A mathematical model method for calculating the parameter signals of the blade deflection and the local blade angle is given below, where a specific algorithm program may be programmed not only by applying the mathematical model but also by a model method of another type, which is not limited to the embodiment.

Figure 4:
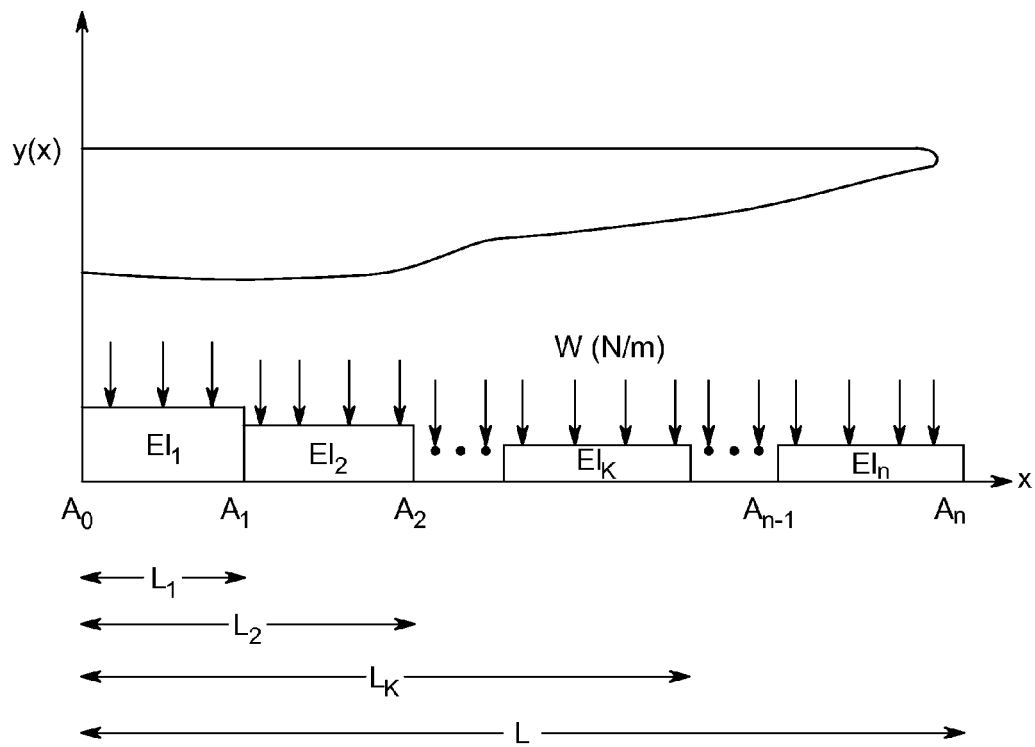
FIG. 4 is a schematic diagram of a simplified equivalent cantilever beam model of the blade shown in FIG. 2.

The blade 142 may be simplified to be equivalent to a cantilever beam model shown in FIG. 4. It is assumed that a mean load borne by the blade is w (N/m), relations between the blade deflection y(x) and a horizontal coordinate x of the cantilever beam and between the local blade angle θ(x) and the horizontal coordinate x of the cantilever beam may be separately represented by using the following formulas:

$$y(x) = \frac{-w}{24EI(x)}(x^4 - 4Lx^3 + 6L^2x^2), \quad (1)$$

$$\theta(x) = \frac{dy(x)}{dx} = \frac{-w}{6EI(x)}(x^3 - 3Lx^2 + 3L^2x), \quad (2)$$

where EI(x) is an elasticity modulus, and L is a total length of the blade. The elasticity modulus EI(x) of the blade changes over a position x of the blade. As shown in FIG. 4, a total length L of the blade 142 from a root part $A_0$ to a tip part $A_n$ is divided into n parts, where the n parts may be n equal parts with a same length or be n parts with different lengths, and nodes for dividing the n parts successively are $A_1, A_2 \ldots$, and $A_{n-1}$. It is assumed that a length from the root part $A_0$ of the blade 142 to each node $A_1, A_2 \ldots, A_{n-1}$, and tip part $A_n$ is $L_k$ (where $k \in 1, 2 \ldots, n$). For example, a length from the root part $A_0$ to the first node $A_1$ is $L_1$, a length from the root part $A_0$ to the second node $A_2$ is $L_2$, and a length from the root part $A_0$ to the kth node $A_k$ is $L_k$. An elasticity modulus corresponding to each part is $EI_k$ (where $k \in 1, 2 \ldots, n$). The blade deflection y(x) and local blade angle θ(x) corresponding to the kth part may be separately represented by using the following formulas:

$$y_k = \frac{-w}{24EI_k}[(L_k - L_{k-1})^4 - 4(L_n - L_{k-1})(L_k - L_{k-1})^3 + 6(L_n - L_{k-1})^2(L_k - L_{k-1})^2], \quad (3)$$

$$\theta_k = \frac{-w}{6EI_k}[(L_k - L_{k-1})^3 - 3(L_n - L_{k-1})(L_k - L_{k-1})^2 + 3(L_n - L_{k-1})^2(L_k - L_{k-1})], \quad (4)$$

a total blade deflection $y_{ktotal}$ and a total local blade angle $\theta_{ktotal}$ of the kth part of the blade 142 may be separately represented by using the following formulas:

$$y_{ktotal} = y_{k-1total} + y_k + \theta_{k-1}(L_k - L_{k-1}) \quad (5)$$

$$\theta_{ktotal} = \theta_{k-1total} + \theta_k \quad (6),$$

when the local blade angle and the blade deflection of one part are known, the blade deflection and the local blade angle of any part may be obtained through calculation by using an iterative algorithm. Therefore, after the blade deflection and the local blade angle, which are detected by the micro inertial measurement unit 20 located at the blade 142 and are at an installation position, are received, the blade deflection and the local blade angle at any position on the blade 142 may be obtained through calculation by using the signal processing unit 305. Similarly, a processing parameter signal 321 of another type may be obtained through calculation by using a corresponding algorithm, and descriptions are not made one by one herein.

Referring to FIG. 3 again, the signal analyzing unit 307 may receive at least one signal of the detection parameter signal 311 and the processing parameter signal 321 as an analysis parameter signal. In some embodiments, it is necessary to select different analysis parameter signals to analyze different fault states of the blade. The signal analyzing unit 307 is configured to separately analyze each analysis parameter signal to output respective fault estimation signals 331. Each fault estimation signal 331 is used to estimate whether a corresponding blade works in a fault state. In an embodiment, the fault estimation signal 331 may include a fault value used to estimate that a corresponding blade works in a fault state and a normal value used to estimate that a corresponding blade works in a normal state. In an embodiment, the fault value may be set to "1", and the normal value may be set to "0". In another embodiment, the fault value and the normal value may be set to other numerical values. In some embodiments, a same analysis method is used to analyze different analysis parameter signals. In some embodiments, different analysis methods are used separately to analyze different analysis parameter signals.

Figure 5:
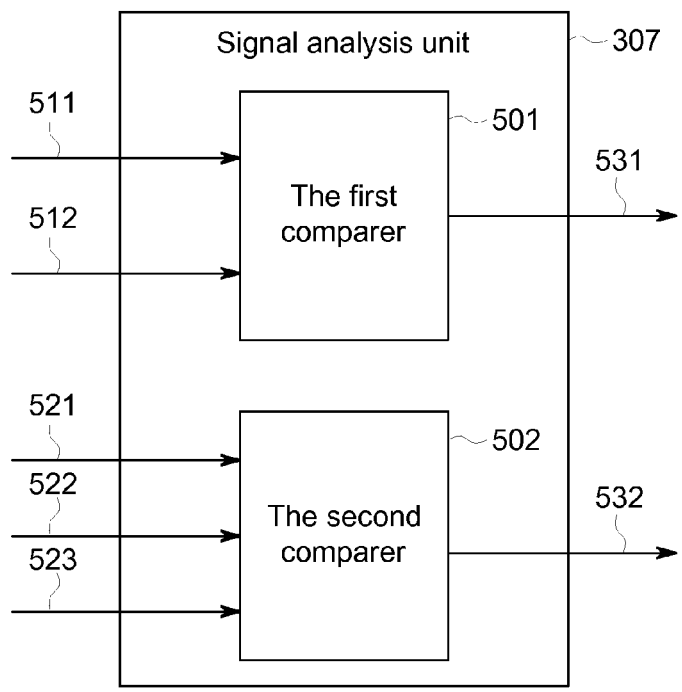
FIG. 5 is a schematic diagram of a signal analyzing unit shown in FIG. 3 according to an embodiment.

Referring to FIG. 5, FIG. 5 is a schematic diagram of the signal analyzing unit 307 shown in FIG. 3 according to an embodiment. As an example of an analysis method, as shown in FIG. 5, the signal analyzing unit 307 includes a first comparer 501, and the first comparer 501 is configured to compare and analyze the analysis parameter signal 511 and a preset parameter signal 512 to generate a fault estimation signal 531. In some embodiments, the preset parameter signal 512 may come from simulation data based on a simulation model of the blade 142, and more specifically, is high simulation data, which is obtained in a simulated real environment condition and corresponds to the analysis parameter signal 511. In some embodiments, the preset parameter signal 512 may come from operating data, which is obtained when the blade normally operates and corresponds to the analysis parameter signal 511. The operating data may include test data when the blade leaves factory and normally operates and historical data in a real environment after the blade is assembled on the wind turbine 10. For example, the historical data may be selected from data corresponding to storage data that a corresponding blade operates in a certain period of time.

Figure 6:
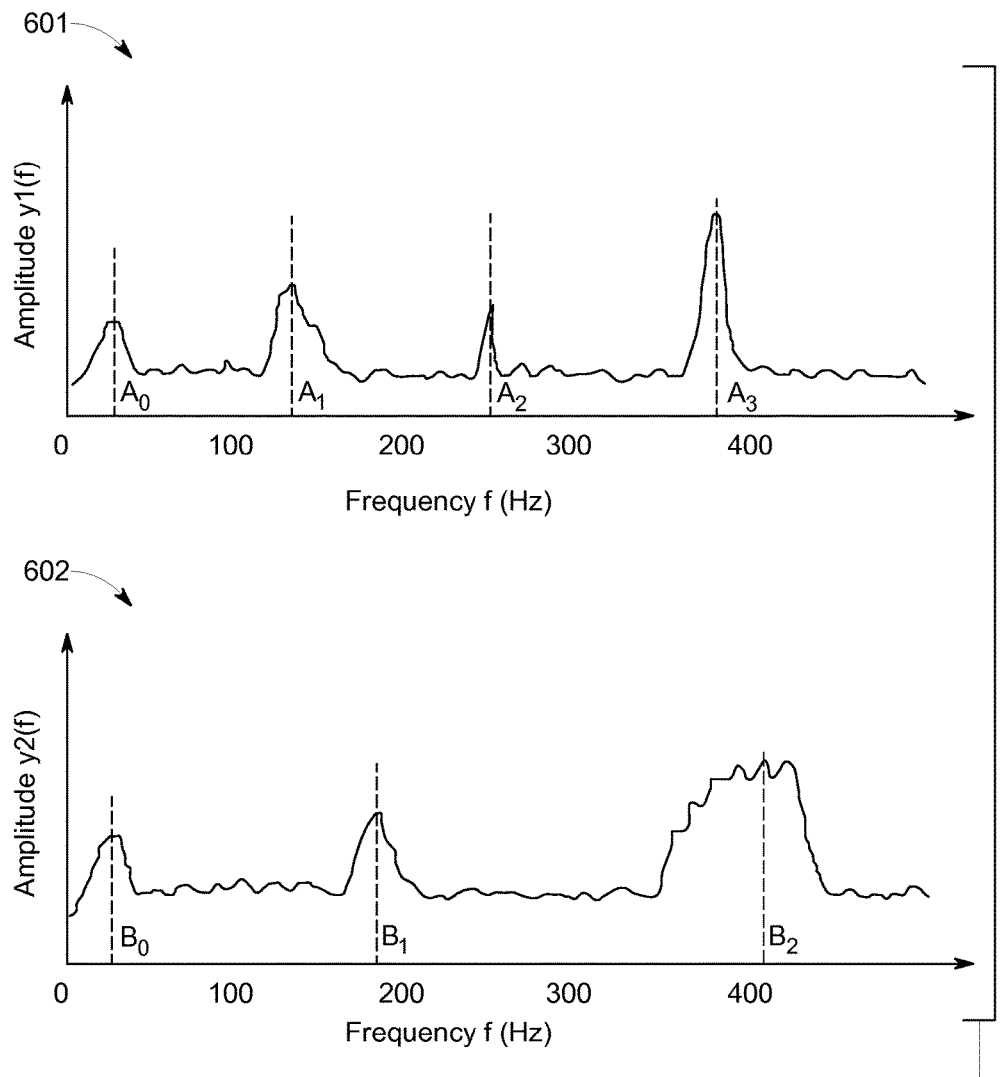
FIG. 6 is amplitude-frequency characteristic curves of a local blade angle obtained through real-time measurement and a local blade angle obtained through simulation of the blade shown in FIG. 2.

More specifically, in an embodiment, the first comparer 501 is configured to implement a frequency domain comparing method. As shown in FIG. 2, the local blade angle detected by the micro inertial measurement unit 20 installed on the blade 142 is used as the analysis parameter signal 511, and local blade angle data obtained in a simulated same environment based on a blade simulation model is used as the preset parameter signal 512. The Fourier Transform (FFT) is performed separately for the local blade angle data 511 measured in real time and the local blade angle data 512 obtained through simulation, to obtain respectively corresponding amplitude-frequency characteristic curves. As shown in FIG. 6, a curve 601 is an amplitude-frequency characteristic curve of the local blade angle data 511 measured in real time, and a curve 602 is an amplitude-frequency characteristic curve of the local blade angle data 512 obtained through simulation. In some embodiments, an amplitude deviation/amplitude deviation ratio may be used to estimate whether the blade 142 works in a fault state, and an algorithm of the amplitude deviation ratio may be as shown in the following formula:

$$\frac{|y1(f) - y2(f)|}{y2(f)} > y_{threshold}, \qquad (7)$$

where y1(f) is an amplitude function of the amplitude-frequency characteristic curve 601, y2(f) is an amplitude function of the amplitude-frequency characteristic curve 602, and $y_{threshold}$ is a set threshold. For each frequency point f, when a corresponding ratio of an absolute value of a difference between y1(f) and y2(f) to y2(f) is greater than the threshold, $y_{threshold}$ such as 10%, namely, when the amplitude deviation ratio is too great, the blade 142 is estimated to work in a fault state, and a fault estimation signal 531 generated by the first comparer 501 is the fault value.

Otherwise, when a characteristic frequency point and/or amplitude of the amplitude-frequency characteristic curve of the local blade angle data 511 measured in real time are/is approximately the same as that of the amplitude-frequency characteristic curve of the local blade angle data 512 obtained through simulation, for example, as shown in formula (7), when a ratio of an absolute value of a difference between y1(f) and y(f) to y2(f) is less than the threshold $y_{threshold}$, such as 10%, namely, the both are approximately the same, the blade 142 is estimated to work in a normal state, and a fault estimation signal 531 generated by the first comparer 501 is the normal value.

In some embodiments, a monitor may also be used to directly observe characteristic frequency points of the amplitude-frequency characteristic curve 601 and the amplitude-frequency characteristic curve 602 to estimate whether the blade 142 works in a fault state. The characteristic frequency points of the amplitude-frequency characteristic curve 601 are $A_0$, $A_1$, $A_2$, and $A_3$, and the characteristic frequency points of the amplitude-frequency characteristic curve 602 are $B_0$, $B_1$, and $B_2$. It can be known from the curves that, the characteristic frequency points of the amplitude-frequency characteristics of the amplitude-frequency characteristic curve 601 and the amplitude-frequency characteristic curve 602 are different. More specifically, frequencies and amplitudes of $A_0$ and $B_0$ are approximately the same; when $A_1$ is compared with $B_1$, the frequency of A1 is shifted; $A_2$ has no corresponding frequency point; and when $A_3$ is compared with $B_2$, a frequency band corresponding to $B_2$ is broader than that of $A_3$. When the characteristic frequency points do not completely correspond to each other, namely, the frequency characteristics are different, the blade 142 is estimated to work in a fault state, and a fault estimation signal 531 generated by the first comparer 501 is the fault value.

Otherwise, if all characteristic frequency points of the amplitude-frequency characteristic curve 601 and the amplitude-frequency characteristic curve 602 completely correspond to each other, namely, are approximately the same, the blade 142 is estimated to work in a normal state, and a fault estimation signal 531 generated by the first comparer 501 is the normal value. Description is made by taking the characteristic frequency point $A_0$ and the characteristic frequency point $B_0$ as an example, if the amplitudes and frequencies of the characteristic frequency point $A_0$ and the characteristic frequency point $B_0$ are the same or a deviation is small, for example, a frequency deviation is merely 1 Hz, it may be considered that the characteristic frequency points are approximately the same.

In another embodiment, the foregoing amplitude-frequency characteristic may also be obtained through calculation by using another algorithm, such as the Hilbert Transform algorithm and the Wiener Transform algorithm.

In another embodiment, the first comparer 501 may also compare the analysis parameter signal 511 with the preset parameter signal 512 by using a time domain comparing method, such as a statistical method of a histogram analysis algorithm, a variance analysis algorithm, a power spectrum analysis algorithm, and a parameter model analysis algorithm. In this case, respective statistical characteristics, such as a distribution point probability, may be analyzed and compared, to estimate whether the blade 142 works in a fault state.

As an example of another analysis method, as shown in FIG. 5, the signal analyzing unit 307 further includes a second comparer 502, where the second comparer 502 is configured to compare same analysis parameter signals 521, 522, and 523 of the plurality of blades 141, 142, and 143 to generate a fault estimation signal 532.

Figure 7:
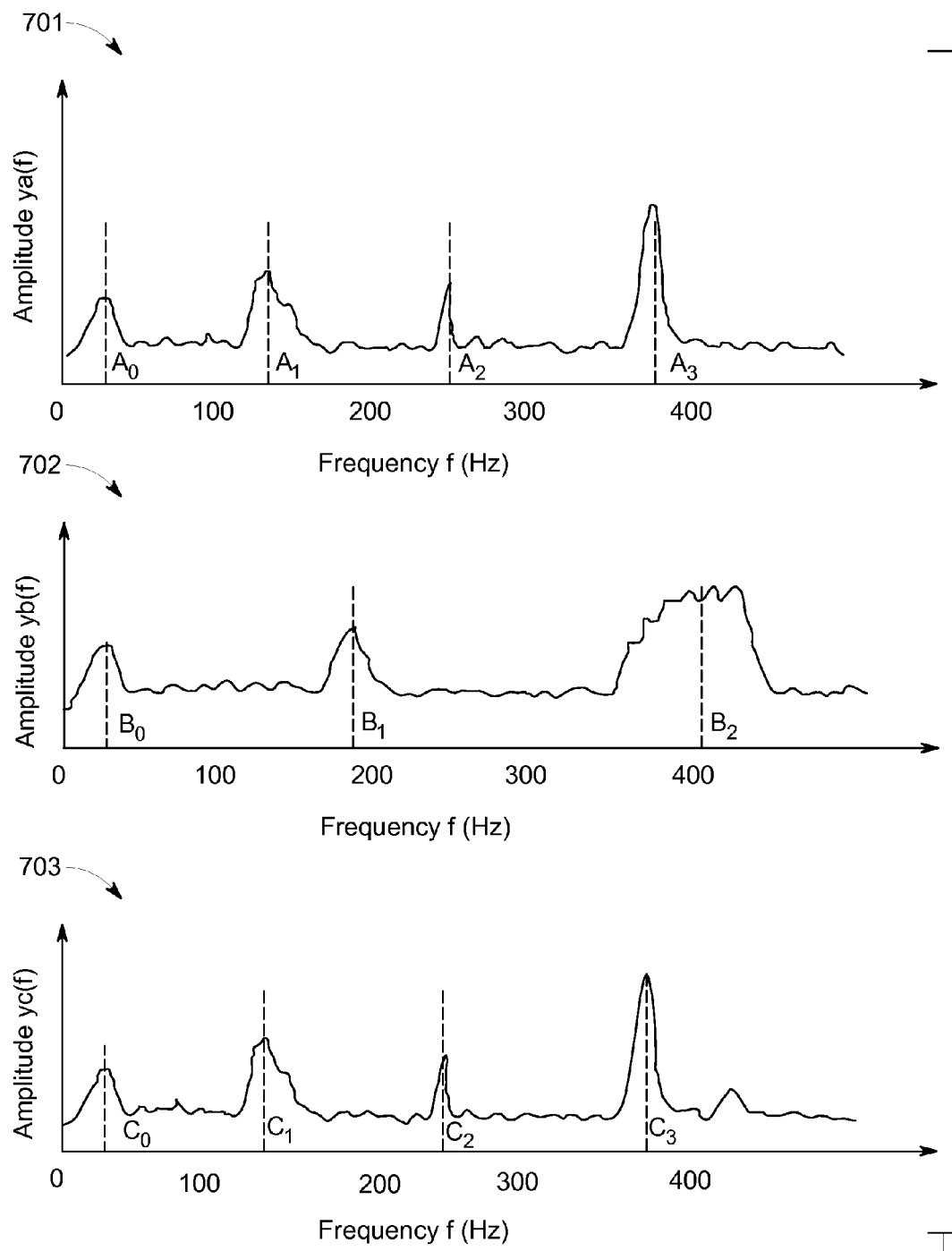
FIG. 7 is amplitude-frequency characteristic curves of local blade angles, which are measured in real time and separately correspond to three blades shown in FIG. 1.

More specifically, in an embodiment, the second comparer 502 is configured to implement a frequency domain comparing method. For example, local blade angles, which are detected by the micro inertial measurement units 20 installed on the blades 141, 142, and 143 shown in FIG. 2 and are at the same positions, are respectively used as the analysis parameter signals 521, 522, and 523. The Fourier Transform (FFT) is performed separately for the local blade angle data 521, 522, and 523, to obtain respectively corresponding amplitude-frequency characteristic curves. As shown in FIG. 7, a curve 701 is an amplitude-frequency characteristic curve of the local blade angle data 521 of the blade 141 measured in real time, a curve 702 is an amplitude-frequency characteristic curve of the local blade angle data 522 of the blade 142 measured in real time, and a curve 703 is an amplitude-frequency characteristic curve of the local blade angle data 523 of the blade 143 measured in real time.

In some embodiments, the formula shown in Formula (7) may be used to calculate amplitude deviations/amplitude deviation ratios corresponding to every two amplitude-frequency characteristic curves, to estimate whether a blade works in a fault state. As an example, when a ratio of an absolute value of a difference between ya(f) and yb(f) to ya(f) is greater than the threshold $y_{threshold}$, such as 10%, a ratio of an absolute value of a difference between ya(f) and yc(f) to ya(f) is less than the threshold $y_{threshold}$ 10% and a ratio of an absolute value of a difference between yb(f) and yc(f) to ya(f) is greater than the threshold $y_{threshold}$ 10% namely, when the amplitude-frequency characteristic of the amplitude-frequency characteristic curve 702 is different from those of the amplitude-frequency characteristic curves 701 and 703 and the amplitude-frequency characteristics of the amplitude-frequency characteristic curves 701 and 703 are approximately the same, the blade 142 is estimated to work in a fault state, and a fault estimation signal 532 generated by the second comparer 502 is the fault value.

Otherwise, if both amplitude deviation ratios of every two of the foregoing blades are less than 10%, namely, when the amplitude-frequency characteristics of the amplitude-frequency characteristic curves 701, 702, and 703 are approximately the same, the blade 142 is estimated to work in a normal state, and a fault estimation signal 532 generated by the second comparer 502 is the normal value.

In some embodiments, a monitor may also be used to directly observe characteristic frequency points of the amplitude-frequency characteristics of the amplitude-frequency characteristic curves 701, 702, and 703, to estimate that a blade works in a fault state. The characteristic frequency points of the amplitude-frequency characteristic curve 701 are $A_0, A_1, A_2$, and $A_3$, characteristic frequency points of the amplitude-frequency characteristic curve 702 are $B_0, B_1$, and $B_2$, and characteristic frequency points of the amplitude-frequency characteristic curve 703 are $C_0, C_1, C_2$, and $C_3$. It can be known from the curves that, the characteristic frequency points of the amplitude-frequency characteristics of the amplitude-frequency characteristic curve 701 and the amplitude-frequency characteristic curve 702 are different. More specifically, frequencies and amplitudes of $A_0$ and $B_0$ are approximately the same; when $A_1$ is compared with $B_1$, the frequency of A1 is shifted; $A_2$ has no corresponding frequency point; and when $A_3$ is compared with $B_2$, a frequency band corresponding to $B_2$ is broader than that of $A_3$. The characteristic frequency points of the amplitude-frequency characteristics of the amplitude-frequency characteristic curve 701 and the amplitude-frequency characteristic curve 703 are approximately the same. More specifically, frequencies and amplitudes of $A_0$ and $C_0$, $A_1$ and $C_1$, $A_2$ and $C_2$, and $A_3$ and $C_3$ are approximately the same separately. The characteristic frequency points of the amplitude-frequency characteristics of the amplitude-frequency characteristic curve 703 and the amplitude-frequency characteristic curve 702 are different. More specifically, frequencies and amplitudes of $C_0$ and $B_0$ are approximately the same; when $C_1$ is compared with $B_1$, the frequency of C1 is shifted; $C_2$ has no corresponding frequency point; and when $C_3$ is compared with $B_2$, a frequency band corresponding to $B_2$ is broader than that of $C_3$. That is, compared with other blades 141 and 143, the characteristic frequency points of the blade 142 do not completely correspond to each other, the blade 142 is estimated to work in a fault state, and a fault estimation signal 532 generated by the second comparer 502 is the fault value.

Otherwise, when all characteristic frequency points corresponding to the amplitude-frequency characteristic curves 701, 702, and 703 completely correspond to each other, namely, are approximately the same, the blades 141, 142, and 143 are estimated to work in a normal state, and a fault estimation signal 532 generated by the second comparer 502 is the normal value. Description is made by taking the characteristic frequency point $A_0$, the characteristic frequency point $B_0$ and the characteristic frequency point $C_0$ as an example, if the amplitudes and frequencies of the characteristic frequency point $A_0$, the characteristic frequency point $B_0$, and the characteristic frequency point $C_0$ are the same or a deviation is small, for example, a frequency deviation is merely 1 Hz, it may be considered that the characteristic frequency points are approximately the same.

In another embodiment, the foregoing amplitude-frequency characteristic may also be obtained through calculation by using another algorithm, such as the Hilbert Transform algorithm and the Wiener Transform algorithm.

In another embodiment, the second comparer 502 may implement a time domain comparing method, such as a histogram analysis algorithm, a variance analysis algorithm, a power spectrum analysis algorithm, and a parameter model analysis algorithm. For example, blade tip offsets, which are obtained by processing of the micro inertial measurement units 20 installed on the blades 141, 142, and 143 shown in FIG. 2 and are at the same positions, are respectively used as the analysis parameter signals 521, 522, and 523. The histogram analysis method is used separately for the blade tip offsets 521, 522, and 523 obtained by real-time processing, to obtain a probability statistical characteristic curve of the blade tip offsets in a distance of 0 to 3 meters.

Figure 8:
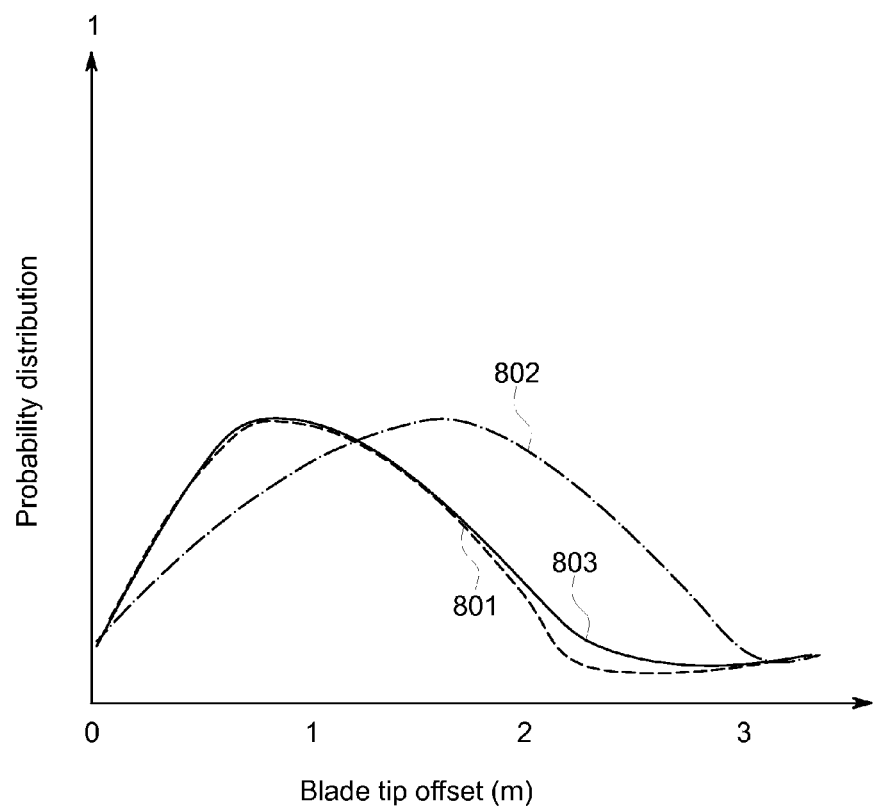
FIG. 8 is statistical characteristic curves of blade tip offsets, which are obtained through processing and separately correspond to three blades shown in FIG. 1.

As shown in FIG. 8, a curve 801 is a statistical characteristic curve of the blade tip offset 521 of the blade 141 obtained by real-time processing, a curve 802 is a statistical characteristic curve of the blade tip offset 522 of the blade 142 obtained by real-time processing, and a curve 803 is a statistical characteristic curve of the blade tip offset 523 of the blade 143 obtained by real-time processing. In some embodiments, an absolute value of a difference of probability values of the statistical characteristic curves may be calculated and compared with a set threshold, to estimate whether a blade works in a fault state. For example, when absolute values of probability differences corresponding to all blade tip offset distance values of the statistical characteristic curve 801 and the statistical characteristic curve 803 are less than a set threshold 1%, a part of or all probability differences at different blade tip offset distance values of the statistical characteristic curve 802 and the statistical characteristic curve 801 are greater than 1%, and a part of or all probability differences at different blade tip offset distance values of the statistical characteristic curve 802 and the statistical characteristic curve 803 are greater than 1%, namely, when statistical characteristics of the blades 141 and 143 are approximately the same and a statistical characteristic of the blade 142 is different from statistical characteristics of the blades 142 and 143, the blade 142 is estimated to work in a fault state, and a fault estimation signal 532 generated by the second comparer 502 is the fault value.

Otherwise, when the probability differences corresponding to all blade tip offset distance values of every two statistical characteristic curves among the statistical characteristic curves 801, 802, and 803 are less than 1%, namely, the statistical characteristics are approximately the same, the blades 141, 142, and 143 are estimated to work in a normal state, and a fault estimation signal 532 generated by the second comparer 502 is the normal value.

Return to FIG. 3, the fault evaluating unit 309 evaluates, according to the plurality of fault estimation signals 331 by using a corresponding algorithm, a probability that a corresponding blade works in a fault state.

As an example of an algorithm, the fault evaluating unit 309 evaluates, by using a weighting algorithm based on a plurality of fault estimation signals 331, a probability that a corresponding blade works in a fault state. The weighting algorithm may be represented by using the following formulas:

$$P = \sum_{i=1}^{n} w_i F_i$$

$$\sum_{i=1}^{n} w_i = 1,$$

$$w_i \in [0, 1]$$

where P represents a fault probability signal, and $F_1$ is the ith fault estimation signal (fault state: $F_i=1$; normal state: $F_i=0$). $w_i$ is a weighted value corresponding to the ith analysis parameter signal, and $w_i \in (0, 1)$. In some embodiments, the weighted value $w_i$ corresponding to the $i^{th}$ analysis parameter signal may be obtained through training by using a training algorithm such as a neural algorithm or a fuzzy algorithm. In another embodiment, the weighted value $w_i$ corresponding to the $i^{th}$ fault estimation signal may be set based on experience according to evaluation importance of the analysis parameter signal for the fault state. For example, when the blade deflection is used as the $i^{th}$ analysis parameter signal and has a great effect on the evaluation of a blade crack fault state, the weighted value $w_i$ may be set to 0.4. When P is greater than a set threshold such as 0.75, a corresponding blade is evaluated to work in a fault state. In some embodiments, an output signal 341 of the fault evaluating unit 309 is the fault probability signal P. In another embodiment, when the blade is evaluated to work in a fault state, the output signal 341 is 1, and when the blade is evaluated to work in a normal state, the output signal 341 is 0.

In another embodiment, the fault evaluating unit 309 may use another algorithm based on the plurality of fault estimation signals. For example, when more than a certain percentage of fault estimation signals are fault values, for example, more than ⅔ fault estimation signals are fault values, a corresponding blade is evaluated to work in a fault state. Otherwise, the corresponding blade is evaluated to work in a normal state. Similarly, in some embodiments, the output signal 341 is a scale value of a fault estimation signal of the fault value. In another embodiment, when the blade is evaluated to work in a fault state, the output signal 341 is 1, and when the blade is evaluated to work in a normal state, the output signal 341 is 0.

Figure 9:
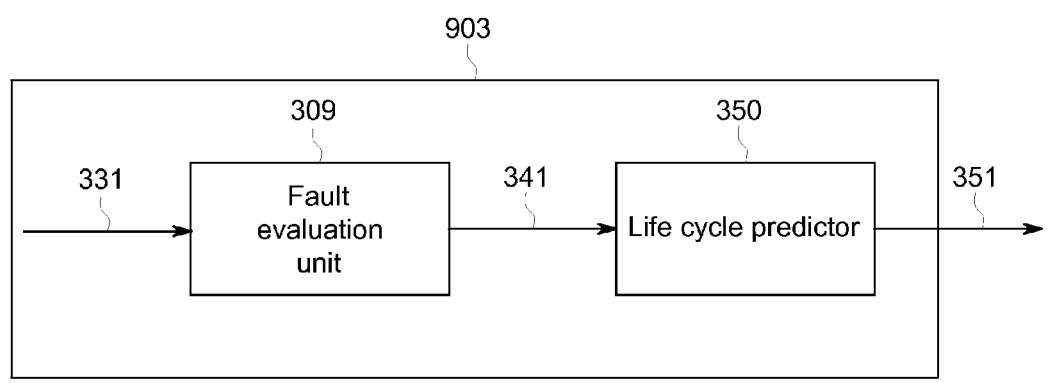
FIG. 9 is a schematic block diagram of a wind turbine blade fault monitoring system according to another embodiment of the present invention.

Referring to FIG. 9, FIG. 9 is a schematic block diagram of a wind turbine blade fault monitoring system 903 according to another embodiment of the present invention. Compared with the monitoring system 303 shown in FIG. 3, the fault monitoring system 903 further includes a life cycle predictor 350. The life cycle predictor 350 is configured to analyze the output signal 341 of the fault evaluating unit 309, to obtain a life cycle warning signal 351 of a monitored blade such as the blade 142. The life cycle warning signal 351 may be used to estimate time that the blade 142 can still operate, so as to maintain or replace the blade 142.

In an embodiment, the life cycle predictor 350 may implement an accumulation algorithm. For example, when the output signal 341 is the fault probability signal P, P is accumulated, and when an accumulative result is greater than a set threshold such as 100, the life cycle predictor 350 generates the life cycle warning signal 351, to predict that the life cycle of the blade 142 is coming to an end, and that it is necessary to replace the blade 142.

In another embodiment, the life cycle predictor 350 may implement a statistical method, such as a rainflow cycle counting method. When the output signal 341 is the fault probability signal P, statistics collection of the rainflow cycle counting method is performed on P, and when times that P is greater than a set threshold (such as ⅔) are more than a set threshold (such as 100), the life cycle predictor 350 generates the life cycle warning signal 351, to predict that the life cycle of the blade 142 is coming to an end, and that it is necessary to replace the blade 142.

Figure 10:
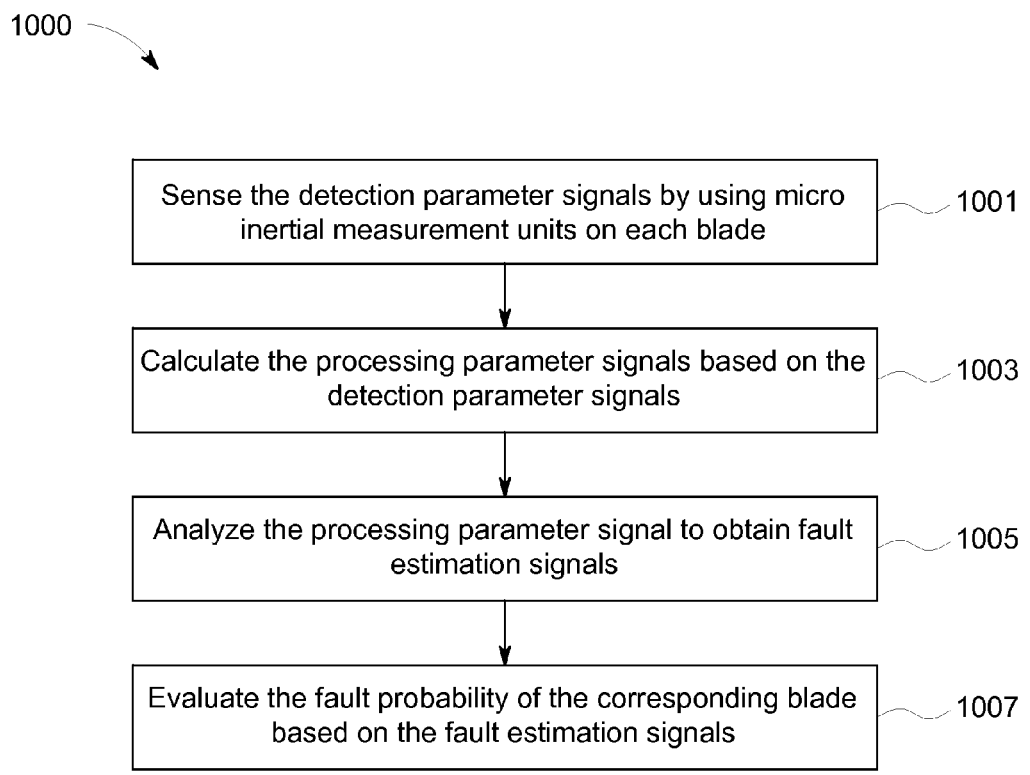
FIG. 10 is a flowchart of a method for evaluating a health state of a wind turbine blade according to an embodiment of the present invention.

Referring to FIG. 10, FIG. 10 is a flowchart of a method 1000 for evaluating a health state of a wind turbine blade according to an embodiment. The method 1000 is used to execute a process shown in FIG. 3 that the monitoring system 303 monitors a blade state. The method 1000 includes the following steps. Step 1001: sense a plurality of detection parameter signals 311 at corresponding installation positions by using micro inertial measurement units 20 installed on each blade 141, 142, and 143. Step 1003: calculate based on the plurality of detection parameter signals 311, to obtain a processing parameter signal 321. Step 1005: analyze an analysis parameter signal, to obtain a fault estimation signal 331, where the analysis parameter signal is selected from the plurality of detection parameter signals 311 and the processing parameter signal 321, and each fault estimation signal 331 is used to estimate whether a corresponding blade works in a fault state. Step 1007: evaluate, based on a plurality of fault estimation signals 331, whether a corresponding blade fails or a probability that the corresponding blade fails. A specific working process in the foregoing steps is described in the foregoing paragraphs, and details are not described herein again.

Although the present invention is described with reference to specific embodiments, a person skilled in the art should understand that, many modifications and variations may be made for the present invention. Therefore, it should be aware that, intention of the claims lies in all the modifications and variations covered in a real concept and scope of the present invention.

What is claimed is:
1. A wind turbine comprising:
a plurality of blades;
a micro inertial measurement unit mounted on each of the plurality of blades, and configured to sense a plurality of detection parameter signals at corresponding blade; and
a monitoring system, configured to monitor an operating state of the plurality of blades, and the monitoring system comprises:
a signal processing unit, configured to obtain a plurality of processed parameter signals by processing the plurality of detection parameter signals obtained by the micro inertial measurement unit, wherein the plurality of processed parameter signals comprises at least one from a blade pitch, a blade rotating speed, a blade deflection, a local blade angle, a blade torque, a blade tip offset, and a three-dimensional motion trail;

a signal analyzing unit, configured to analyze each of a plurality of analysis parameter signals to obtain a plurality of fault estimation signals, wherein the plurality of analysis parameter signals are selected from the plurality of detection parameter signals and the plurality of processed parameter signals, and each of the plurality of fault estimation signals is used to estimate whether a corresponding blade works in a fault state, wherein the signal analyzing unit comprises a comparer configured to compare the plurality of analysis parameter signals with a preset parameter signal to generate the plurality of fault estimation signals; and a fault evaluating unit, configured to evaluate, based on a plurality of fault estimation signals, whether a corresponding blade fails or a probability that the corresponding blade fails, wherein when a corresponding blade fails or a probability that the corresponding blade fails is greater than a threshold, the corresponding blade is adapted to be maintained or replaced.

2. The wind turbine according to claim 1, wherein the plurality of processed parameter signals comprises a local blade angle.

3. The wind turbine according to claim 2, wherein the comparer is further configured to compare and to analyze amplitude-frequency characteristics of one of the analysis parameter signals and the preset parameter signal, and, when a deviation between an amplitude-frequency characteristic of the one of the plurality of analysis parameter signals and an amplitude-frequency characteristic of the preset parameter signal is greater than a set threshold, to estimate that a corresponding blade works in a fault state.

4. The wind turbine according to claim 3, wherein the preset parameter signal comes from simulation data, which is based on a blade model and corresponds to the one of the plurality of analysis parameter signals, and test data or historical data, which is based on blade operation and corresponds to the one of the plurality of analysis parameter signals.

5. The wind turbine according to claim 1, wherein the signal analyzing unit comprises a comparer, and the comparer is configured to compare same analysis parameter signals corresponding to the plurality of blades, and when, a deviation between an analysis parameter signal of one blade and an analysis parameter signal of any other blade is greater than a set threshold and all deviations between analysis parameter signals of other blades are less than the set threshold, to estimate that the blade works in a fault state.

6. The wind turbine according to claim 5, wherein the comparer is configured to compare statistical characteristics of the same analysis parameter signals corresponding to the plurality of blades.

7. The wind turbine according to claim 1, wherein the fault evaluating unit evaluates, by using a weighting algorithm based on the plurality of fault estimation signals, the probability that the corresponding blade fails.

8. The wind turbine according to claim 7, wherein the monitoring system further comprises a life cycle predictor, and the life cycle predictor is configured to analyze the fault probability signal to predict a life cycle of a corresponding blade.

9. A method for operating a wind turbine, the method comprising:

sensing a plurality of detection parameter signals by a micro inertial measurement unit mounted on each of the plurality of blades;

obtaining a plurality of processed parameter signals by processing the plurality of detection parameter signals, wherein the plurality of processed parameter signals comprises at least one from a blade pitch, a blade rotating speed, a blade deflection, a local blade angle, a blade torque, a blade tip offset, and a three-dimensional motion trail;

analyzing each of a plurality of analysis parameter signals to obtain a plurality of fault estimation signals, wherein the plurality of analysis parameter signals are selected from the plurality of detection parameter signals and the plurality of processing parameter signals, and each of the plurality of fault estimation signals is used to estimate whether a corresponding blade works in a fault state; and evaluating, based on a plurality of fault estimation signals, whether a corresponding blade fails or a probability that the corresponding blade fails; and;

when a corresponding blade fails or a probability that the corresponding blade fails is greater than a threshold, maintaining or replacing the corresponding blade, wherein the step of obtaining the fault estimation signal comprises:

comparing the plurality of analysis parameter signals with a preset parameter signal; and when a deviation between one of the plurality of analysis parameter signals and the preset parameter signal is greater than a set threshold, estimating that the corresponding blade works in a fault state.

10. The method according to claim 9, wherein the plurality of processed parameter signals comprises a local blade angle.

11. The method according to claim 10, wherein the comparing step comprises comparing and analyzing amplitude-frequency characteristics of the plurality of analysis parameter signals and the preset parameter signal.

12. The method according to claim 9, wherein the comparing step comprises:

comparing and analyzing same analysis parameter signals corresponding to the plurality of blades; and when a deviation between an analysis parameter signal of one blade and an analysis parameter signal of any other blade is greater than a set threshold and all deviations between analysis parameter signals of other blades are less than the set threshold, estimating that the blade works in a fault state.

13. The method according to claim 12, wherein the comparing and analyzing step comprises comparing and analyzing statistical characteristics of the same analysis parameter signals corresponding to the plurality of blades.

14. The method according to claim 9, wherein the step of evaluating the probability that the corresponding blade fails comprises evaluating, by using a weighting algorithm based on the plurality of fault estimation signals, the probability that the corresponding blade fails.

* * * * *